United States Patent
Rimmington et al.

(10) Patent No.: US 10,563,508 B2
(45) Date of Patent: Feb. 18, 2020

(54) CONVEYOR PAN

(71) Applicant: Joy MM Delaware, Inc., Wilmington, DE (US)

(72) Inventors: Gareth Rimmington, South Yorks (GB); Tim Proctor, Worcestershire (GB); Adrian Jones, Worcestershire (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 72 days.

(21) Appl. No.: 15/751,032

(22) PCT Filed: Oct. 1, 2015

(86) PCT No.: PCT/US2015/053497
§ 371 (c)(1),
(2) Date: Feb. 7, 2018

(87) PCT Pub. No.: WO2017/027048
PCT Pub. Date: Feb. 16, 2017

(65) Prior Publication Data
US 2018/0229939 A1    Aug. 16, 2018

Related U.S. Application Data

(60) Provisional application No. 62/202,625, filed on Aug. 7, 2015.

(51) Int. Cl.
*E21F 13/06* (2006.01)
*E21C 35/20* (2006.01)
*B65G 19/28* (2006.01)

(52) U.S. Cl.
CPC ............ *E21F 13/066* (2013.01); *B65G 19/28* (2013.01); *B65G 19/287* (2013.01); *E21C 35/20* (2013.01)

(58) Field of Classification Search
CPC ..... B65G 19/28; B65G 19/287; E21F 13/066; E21F 13/068; E21F 13/086; E21C 35/12; E21C 35/20
See application file for complete search history.

(56) References Cited

U.S. PATENT DOCUMENTS 3,779,604 A    12/1973 Heyer et al.
3,915,500 A    10/1975 Schlusener et al.
(Continued)

FOREIGN PATENT DOCUMENTS

CN    1625642 A    6/2005
CN    101387201 A    3/2009
(Continued)

OTHER PUBLICATIONS

Search Report from the Polish Patent Office for related Application No. P.425653 dated Oct. 30, 2018 (3 Pages).
(Continued)

*Primary Examiner* — Gene O Crawford
*Assistant Examiner* — Keith R Campbell
(74) *Attorney, Agent, or Firm* — Michael Best & Friedrich LLP (57) ABSTRACT

A conveyor pan is provided for supporting a portion of a mining conveyor extending along a mine face and positioned between the mine face and a goaf. The conveyor pan includes a deck, a toe, and a heel. The deck includes a first side configured to be positioned proximate the mine face and a second side configured to be positioned proximate the goaf. The toe is positioned adjacent the first side of the deck, and includes a toe contact surface defining a toe surface area. The heel is positioned adjacent the second side of the deck, and includes a lug and a heel contact surface. The lug is
(Continued)

configured to be coupled to an advancement mechanism. The heel contact surface defines a heel surface area greater than the toe surface area.

23 Claims, 10 Drawing Sheets

(56) References Cited

U.S. PATENT DOCUMENTS

| | | | |
|---|---|---|---|
| 4,327,946 A | 5/1982 | Kirchbrucher et al. | |
| 4,373,757 A * | 2/1983 | Gehle | B65G 19/28 |
| | | | 198/735.6 |
| 4,389,072 A | 6/1983 | Linke et al. | |
| 4,492,410 A | 1/1985 | Schlusener et al. | |
| 4,571,003 A | 2/1986 | Roling et al. | |
| 4,571,004 A | 2/1986 | Braun et al. | |
| 5,033,604 A | 7/1991 | Steinkuhl et al. | |
| 5,272,289 A * | 12/1993 | Cocksedge | E21C 35/12 |
| | | | 198/735.1 |
| 5,338,103 A | 8/1994 | Rassmann | |
| 5,601,341 A * | 2/1997 | Merten | E21C 29/10 |
| | | | 198/735.1 |
| 5,871,261 A | 2/1999 | Bandy, Jr. et al. | |
| 6,896,121 B2 * | 5/2005 | Vorsteher | B65G 19/28 |
| | | | 198/725 |
| 6,966,429 B2 | 11/2005 | Vorsteher et al. | |
| 7,032,743 B2 * | 4/2006 | Vorsteher | B65G 19/285 |
| | | | 198/735.1 |
| 7,392,896 B2 | 7/2008 | Wirtz et al. | |
| 7,399,039 B2 | 7/2008 | Bettermann et al. | |
| 9,132,963 B2 * | 9/2015 | Baier | B65G 19/287 |
| 2003/0213676 A1 | 11/2003 | Vorsteher et al. | |
| 2005/0126891 A1 | 6/2005 | Wirtz et al. | |
| 2009/0066147 A1 | 3/2009 | Tout et al. | |
| 2011/0220466 A1 | 9/2011 | Fischer et al. | |
| 2013/0313887 A1 | 11/2013 | Vasey et al. | |
| 2015/0061350 A1 | 3/2015 | Paterson | |

FOREIGN PATENT DOCUMENTS

| | | |
|---|---|---|
| CN | 101821478 A | 9/2010 |
| CN | 103249910 A | 8/2013 |
| CN | 103422854 A | 12/2013 |
| GB | 2048813 A | 12/1980 |
| GB | 2096671 A | 10/1982 |
| PL | 294583 A1 | 11/1993 |
| PL | 59754 Y1 | 5/2003 |

OTHER PUBLICATIONS

International Preliminary Report on Patentability and Written Opinion for Application No. PCT/US2015/053497 dated Feb. 13, 2018 (8 pages).

Office Action issued from the Chinese Patent Office for related Application No. 201580083301.8 dated Dec. 12, 2018 (9 pages including Statement of Relevance).

* cited by examiner

CONVEYOR PAN

CROSS-REFERENCE TO RELATED APPLICATION

This application claims the benefit of prior-filed, U.S. Provisional Application No. 62/202,625, filed Aug. 7, 2015, the entire contents of which are hereby incorporated by reference.

BACKGROUND

The present disclosure relates to the field of mining machines, and particularly to a conveyor pan for a longwall mining system.

Longwall shearers include a frame and a pair of cutting assemblies mounted on each end of the frame. Each cutting assembly includes a cutting drum for engaging a mine wall. As the frame traverses a mine frame, the cutting drums cut material from the mine face. In some embodiments, the material is deposited on an armored face conveyor (AFC) and carried away from the mine face. In addition, a series of roof supports support the mine surface above the shearer and the AFC. As the shearer removes material from the mine face, the conveyor, the shearer, and the roof supports move forward through the mine seam. The conveyor may include a pan attached to the base of the roof support by a ram, and the ram advances the conveyor pan toward the mine face after the shearer has passed.

SUMMARY

In one aspect, a conveyor pan is provided for supporting a portion of a mining conveyor extending along a mine face and positioned between the mine face and a goaf. The conveyor pan includes a deck, a toe, and a heel. The deck includes a first side configured to be positioned proximate the mine face and a second side configured to be positioned proximate the goaf. The toe is positioned adjacent the first side of the deck, and includes a toe contact surface defining a toe surface area. The heel is positioned adjacent the second side of the deck, and includes a lug and a heel contact surface. The lug is configured to be coupled to an advancement mechanism. The heel contact surface defines a heel surface area greater than the toe surface area.

In another aspect, a mining conveyor extends along a mine face and is positioned between the mine face and a goaf. The mining conveyor includes a chain conveyor and a support structure. The chain conveyor includes at least one chain and a plurality of flights spaced apart along the at least one chain. The support structure includes a plurality of interconnected conveyor pans. The conveyor pans are positioned adjacent one another such that the flights travel sequentially across each conveyor pan. Each conveyor pan includes a deck, a toe, and a heel. The deck includes a first side configured to be positioned proximate the mine face and a second side configured to be positioned proximate the goaf. The deck contacts the plurality of flights. The toe is positioned adjacent the first side of the deck, and the toe includes a toe contact surface defining a toe surface area. The heel is positioned adjacent the second side of the deck, and the heel includes a lug and a heel contact surface. The lug is configured to be coupled to an advancement mechanism. The heel contact surface defines a heel surface area greater than the toe surface area.

In yet another aspect, a conveyor pan is provided for supporting a portion of a mining conveyor extending along a mine face. The mining conveyor is positioned between the mine face and a goaf. The conveyor pan includes a deck, a toe, and a heel. The deck includes a first side configured to be positioned proximate the mine face, a second side configured to be positioned proximate the goaf, a first end, and a second end. The deck defines a centerline axis extending from the first end to the second end, and the centerline axis is positioned between the first side and the second side. The toe is positioned adjacent the first side of the deck, and the toe includes a toe contact surface. The heel is positioned adjacent the second side of the deck. The heel includes a lug and a heel contact surface. The lug is configured to be coupled to an advancement mechanism. The heel contact surface includes a plurality of protrusions extending away from the centerline axis, and the protrusions define a rear edge. The lug is positioned between the centerline and the rear edge.

Other aspects will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
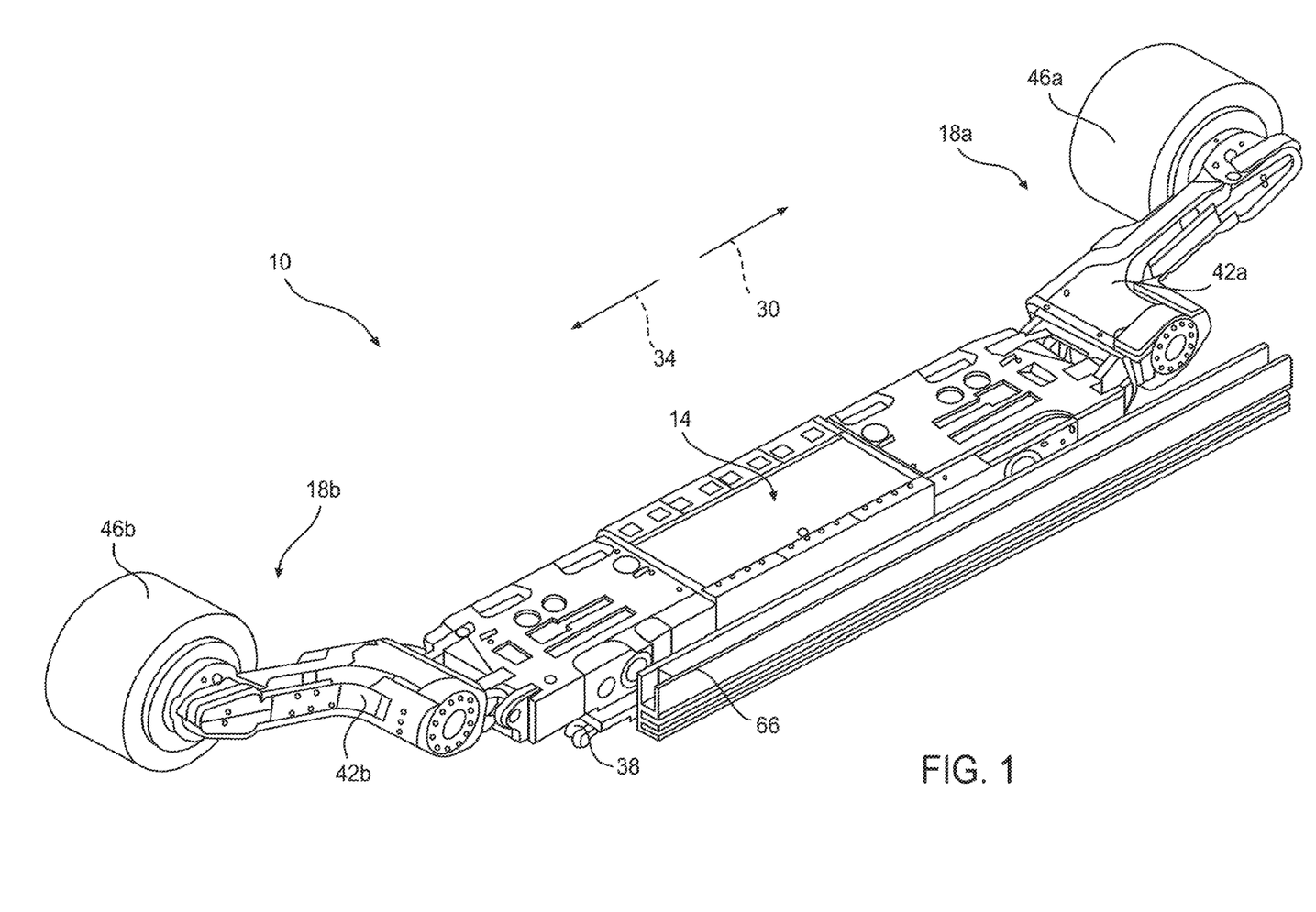
FIG. 1 is a perspective view of a mining machine.

FIG. 1 illustrates a mining machine, such as a longwall shearer 10, including a frame or chassis 14 and a pair of cutting assemblies 18. The chassis 14 is configured to move or tram along a mine face 62 (FIG. 2) in a first direction 30 and a second direction 34 opposite the first direction 30. In the illustrated embodiment, the chassis 14 includes a sprocket (not shown) engaging a rack 40 to form a rack-and-pinion connection, and rotation of the sprocket causes the chassis 14 to move along the rack 38. As the chassis 14 moves in the first direction 30, the first cutting assembly 18a is in a leading position and the second cutting assembly is in a trailing position. In one embodiment, the first cutting assembly 18a is elevated to cut material (e.g., coal or other minerals) from an upper portion of the mine face 62, while the second cutting assembly 18b is in a lower position to cut material from a lower portion of the mine face 62. The position of the cutting assemblies 18a, 18b may be switched when the chassis 14 moves in the second direction 34.

Each cutting assembly 18 includes a ranging arm 42 and a cutter head 46. One end of the ranging arm 42 is pivotably coupled to the chassis 14 and another end supports the cutter head 46 for rotation. The ranging arm 42 is pivoted related to the chassis 14 in order to position the cutter head 46, including raising and lowering the cutter head 46.

Figure 2:
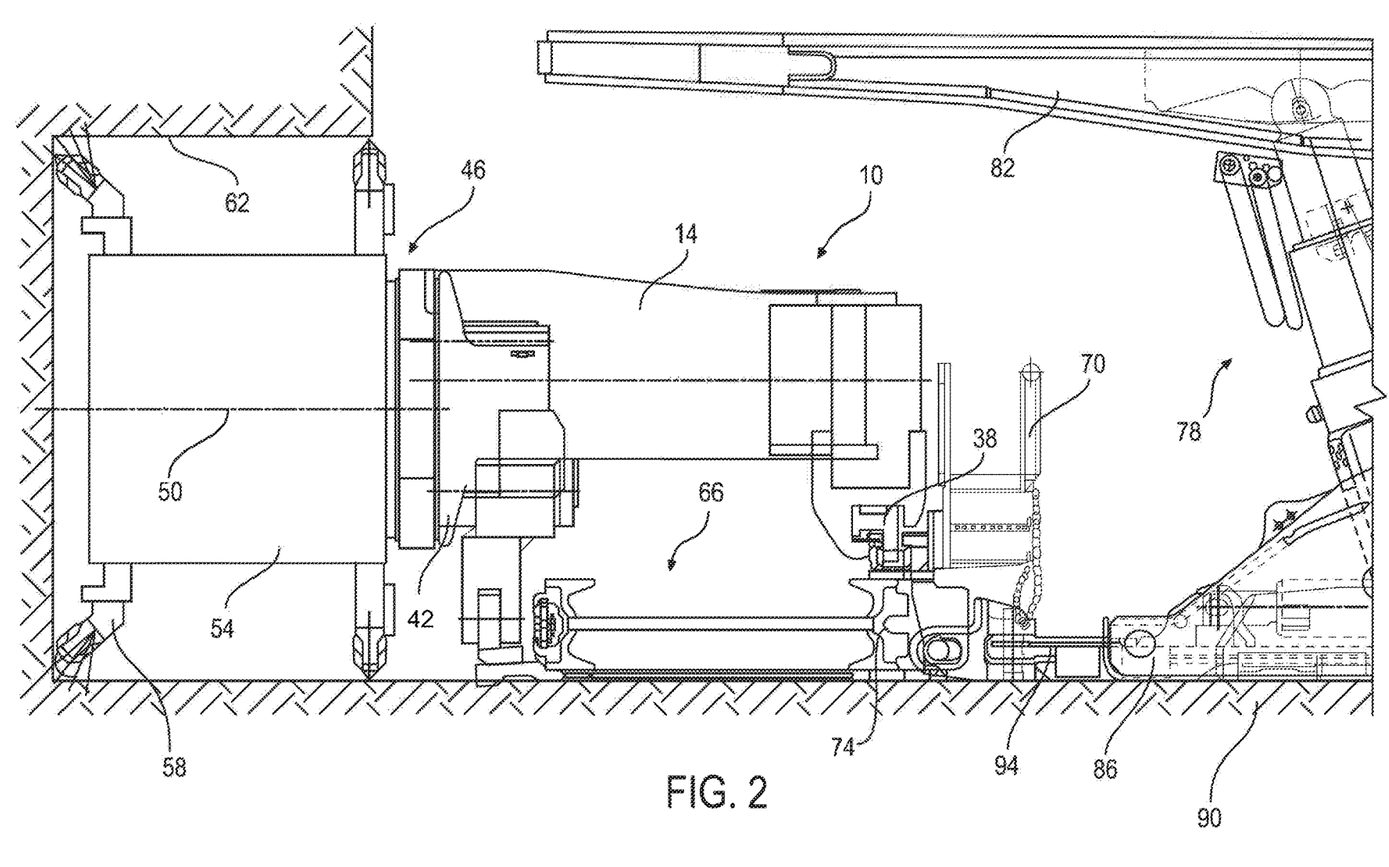
FIG. 2 is a side view of a longwall mining system.

Referring to FIG. 2, the cutter head 46 rotates around an axis 50 and includes an outer surface 54 and multiple picks 58 coupled to the outer surface 54. The picks 58 engage the mine face 62 to remove material from the face 62. In some embodiments, multiple spiral vanes extend along the axis 50. As the cutter head 46 rotates about the axis 50, the vanes carry the cut material from the mine face 62 toward a rear end of the cutter head 46. The cut material is deposited onto a face conveyor 66. In the illustrated embodiment, a spill plate 70 is positioned behind the chassis 14.

The face conveyor 66 includes a conveyor pan structure and a conveying element. In some embodiments, the conveyor pan structure is formed as multiple individual pan sections 74 that are interconnected with one another. The conveying element 66 may be a chain conveyor including a chain or a pair of chains 72 (FIG. 3) and flight bars 76 (FIG. 4) coupled between the chains at regular intervals. As the flight bars 76 are drawn by the chains, the flight bars 76 move sequentially across each pan sections 74 and move cut material along the pan sections 74. In the illustrated embodiment, each conveyor pan section 74 is coupled to the rack 38.

Figure 3:
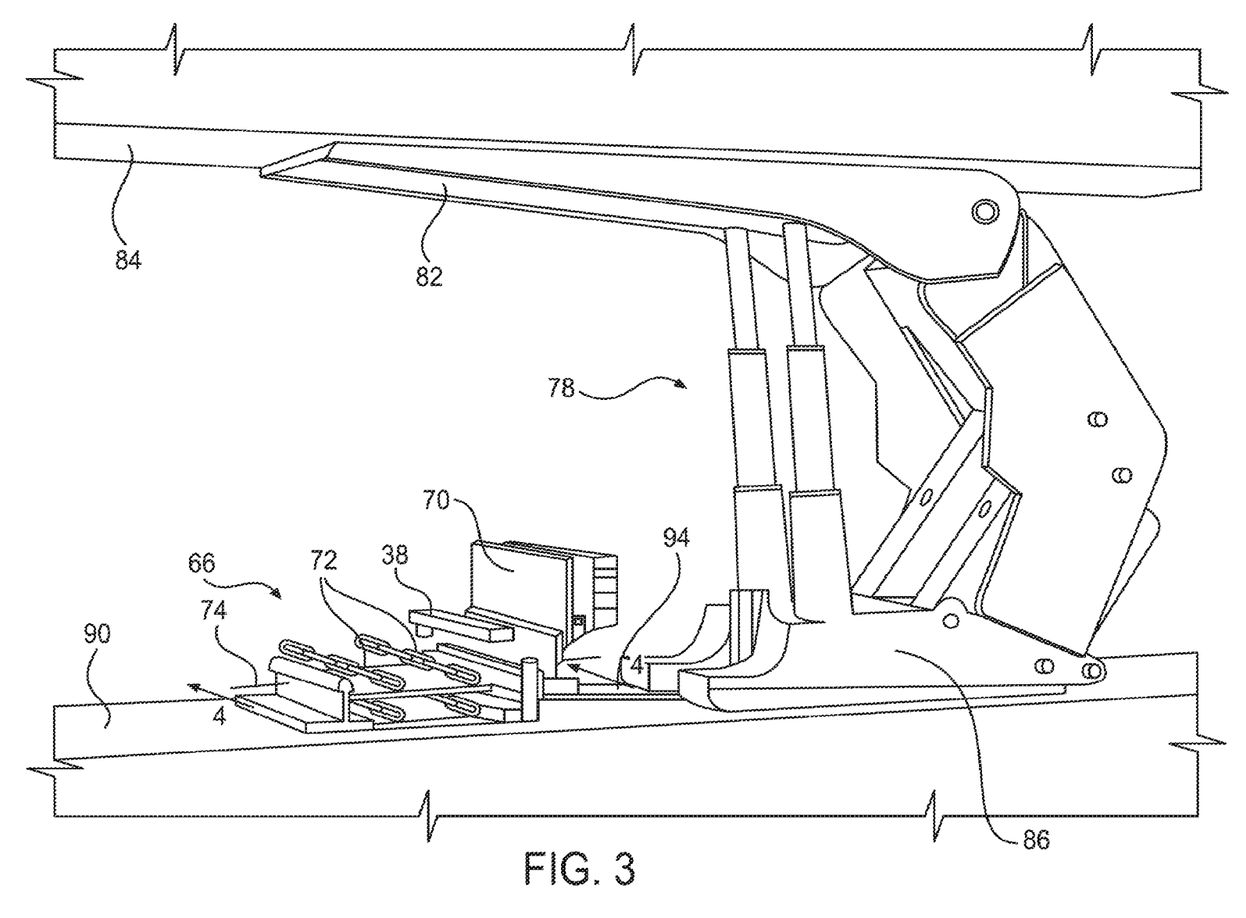
FIG. 3 is a perspective view of a portion of a conveyor and a roof support.
Figure 3A:
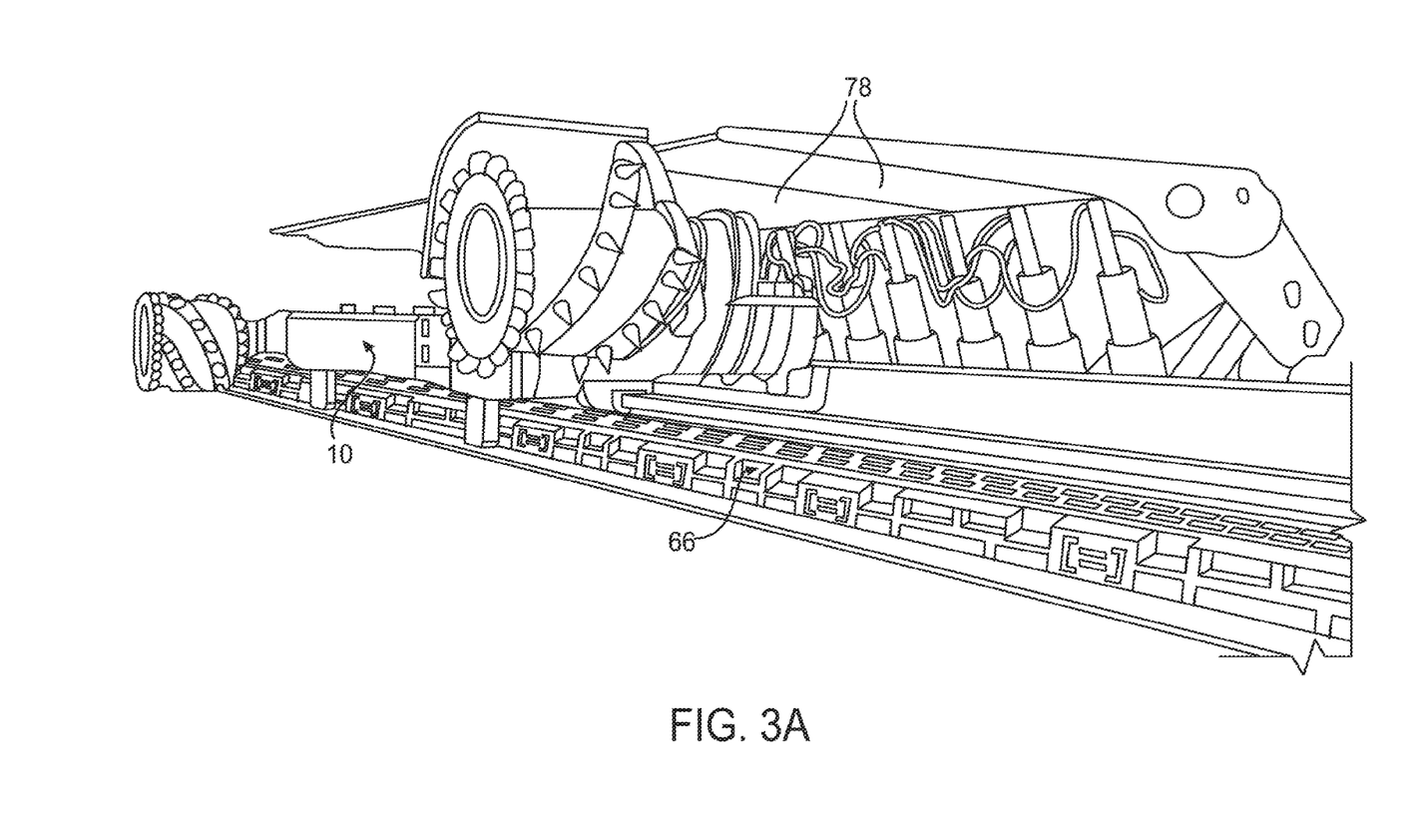
FIG. 3A is a perspective view of the longwall mining system of FIG. 2.

FIGS. 3 and 3A illustrate a portion of the longwall mining system, including the shearer 10, the face conveyor 66, and roof supports 78. As shown in FIGS. 2 and 3, each roof support 78 is positioned behind the conveyor 66 and behind the spill plate 70 (i.e., away from the mine face 62). An area behind the roof support 78 defines the goaf or gob. Each roof support 78 includes a shield 82 extending over the chassis 14 and the conveyor 66 and engaging the mine roof 84 (FIG. 3). Each roof support 78 also includes a base 86 supported on a floor 90. Each roof support 78 further includes a ram 94 (e.g., a hydraulic cylinder) coupled between the base 86 and one of the pan sections 74. After the chassis 14 has moved along the mine face 62 beyond the pan section 74, the ram 94 is actuated to extend and move the pan section 74 forward (i.e., toward the mine face 62). The roof support 78 also advances.

Figure 4:
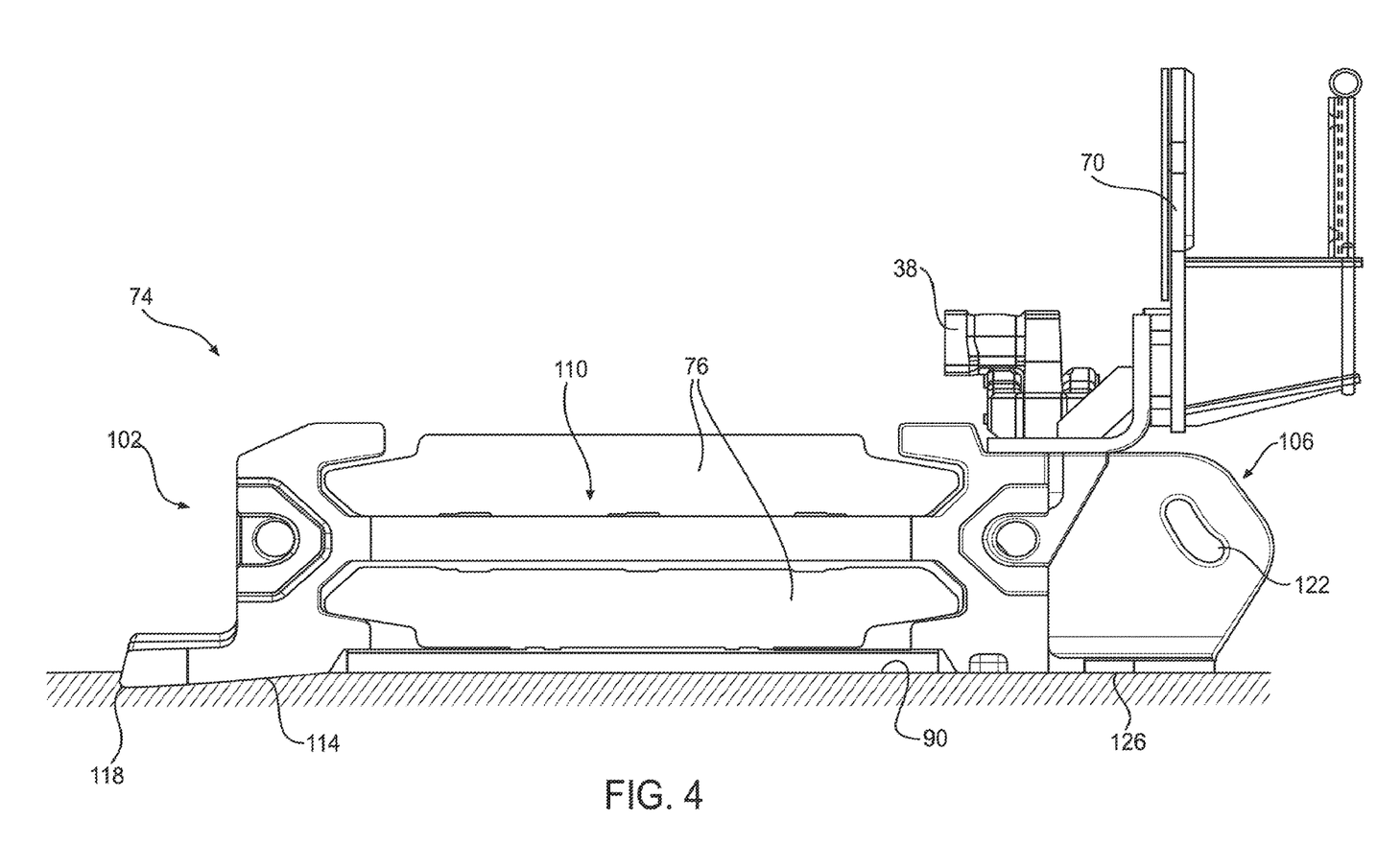
FIG. 4 is a section view of the conveyor of FIG. 3, viewed along section 4-4.

As shown in FIG. 4, each pan section 74 includes a first portion or toe 102, a second portion or heel 106, and a deck or pan 110 extending between the toe 102 and the heel 106. The toe 102 is positioned proximate the mine face 62 and includes a toe contact surface 114 engaging the floor 90. The toe 102 also includes a leading edge 118. The pan 110 supports the structure of the conveyor 66, such as the flight bars 76 and the chain(s) (not shown) to which the flight bars 76 are coupled. The heel 106 is positioned away from the mine face 62, proximate the goaf or gob. The heel 106 includes a lug 122 receiving a pin or other member for coupling the heel 106 to the ram 94. The heel 106 also defines a heel contact surface 126 abutting the floor 90.

Figure 8:
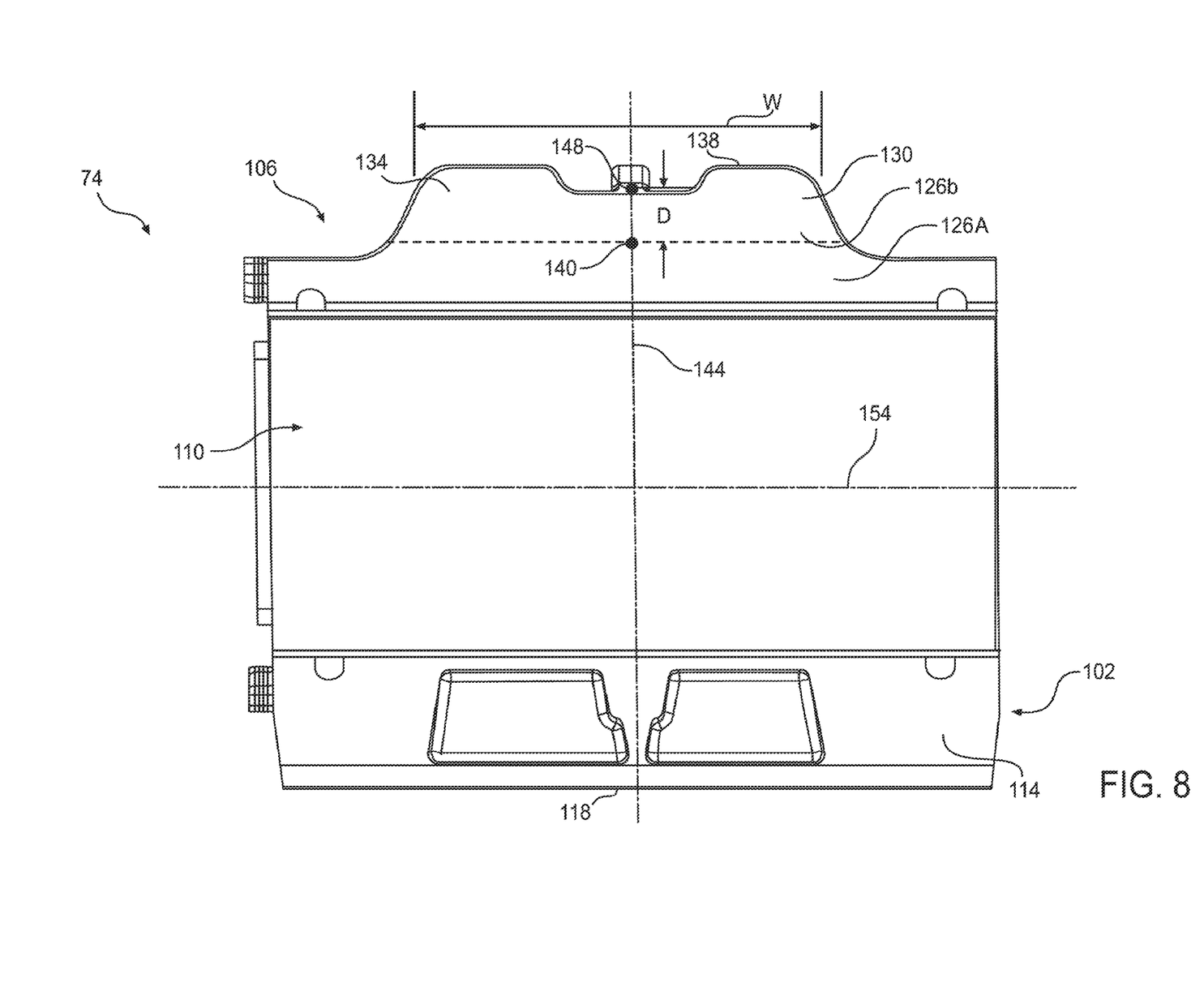
FIG. 8 is a bottom view of the conveyor pan of FIG. 5.

As best shown in FIGS. 5-8, the heel 106 further includes a first protrusion 130 and a second protrusion 134. The protrusions 130, 134 are positioned on either side of a line extending between lug 122 and the leading edge 118. The protrusions 130, 134 define a rear edge 138 extending behind the lug 122. In the illustrated embodiment, the lug 122 is positioned in a recess between the protrusions 130, 134. The protrusions 130, 134 also have outer edges defining a lateral width W (FIG. 8). In one embodiment, the width W is between approximately 45% and approximately 75% of the overall width of the pan section 74. In one embodiment, the width W is approximately 55% of the overall width of the pan section 74.

In some embodiments, the heel contact surface 126 defines a heel surface area that is greater than a surface area of the toe contact surface 114. That is, a ratio of the heel surface area to the toe surface area is greater than 1:1. In some embodiments, the ratio of the heel surface area to the toe surface area is at least approximately 1.2:1. In some embodiments, the ratio of the heel surface area to the toe surface area is at least approximately 1.4:1. In some embodiments, the ratio of the heel surface area to the toe surface area is at least approximately 1.5:1. In some embodiments, the ratio of the heel surface area to the toe surface area is at least approximately 1.6:1. In some embodiments, the ratio of the heel surface area to the toe surface area is at least approximately 1.8:1. In some embodiments, the ratio of the heel surface area to the toe surface area is at least approximately 2:1. In some embodiments, the ratio of the heel surface area to the toe surface area is at least approximately 2.2:1. In some embodiments, the ratio of the heel surface area to the toe surface area is at least approximately 2.3:1. In some embodiments, the ratio of the heel surface area to the toe surface area is approximately 2.32:1.

In some embodiments, the heel surface area is at least approximately 0.5 $m^2$. In some embodiments, the heel surface area is at least approximately 0.6 $m^2$. In some embodiments, the heel surface area is at least approximately 0.7 $m^2$. In some embodiments, the heel surface area is at least approximately 0.8 $m^2$. In some embodiments, the heel surface area is at least approximately 0.9 $m^2$. In some embodiments, the heel surface area is at least approximately 0.95 $m^2$. In some embodiments, the heel surface area is approximately 0.956 $m^2$.

As shown in FIG. 8, the heel contact surface 126 defines a heel centroid 140, or a center of area for the heel contact surface 126. In addition, the pan section 74 defines a pan axis 144 extending between the toe 102 and the heel 106. Stated another way, the pan axis 144 extending generally between the mine face and the goaf. The heel centroid 140 divides the heel contact surface 126 into a first or face-side portion 126a and a second or goaf-side portion 126b. In some embodiments, the goaf-side portion 126b defines a surface area that is at least approximately 0.2 $m^2$. In some embodiments, the goaf-side portion 126b defines a surface area that is at least approximately 0.3 $m^2$. In some embodiments, the goaf-side portion 126b defines a surface area that is at least approximately 0.4 $m^2$. In some embodiments, the goaf-side portion 126b defines a surface area that is at least approximately 0.5 $m^2$. In some embodiments, the goaf-side portion 126b defines a surface area that is approximately 0.6 $m^2$.

In some embodiments, a ratio of the surface area of the goaf-side portion 126b to the heel surface area (i.e., the entire surface area of the heel contact surface 126) is at least 50%. In some embodiments, a ratio of the surface area of the goaf-side portion 126b to the heel surface area is at least 60%. In some embodiments, a ratio of the surface area of the goaf-side portion 126b to the heel surface area is approximately 63%.

Figure 6:
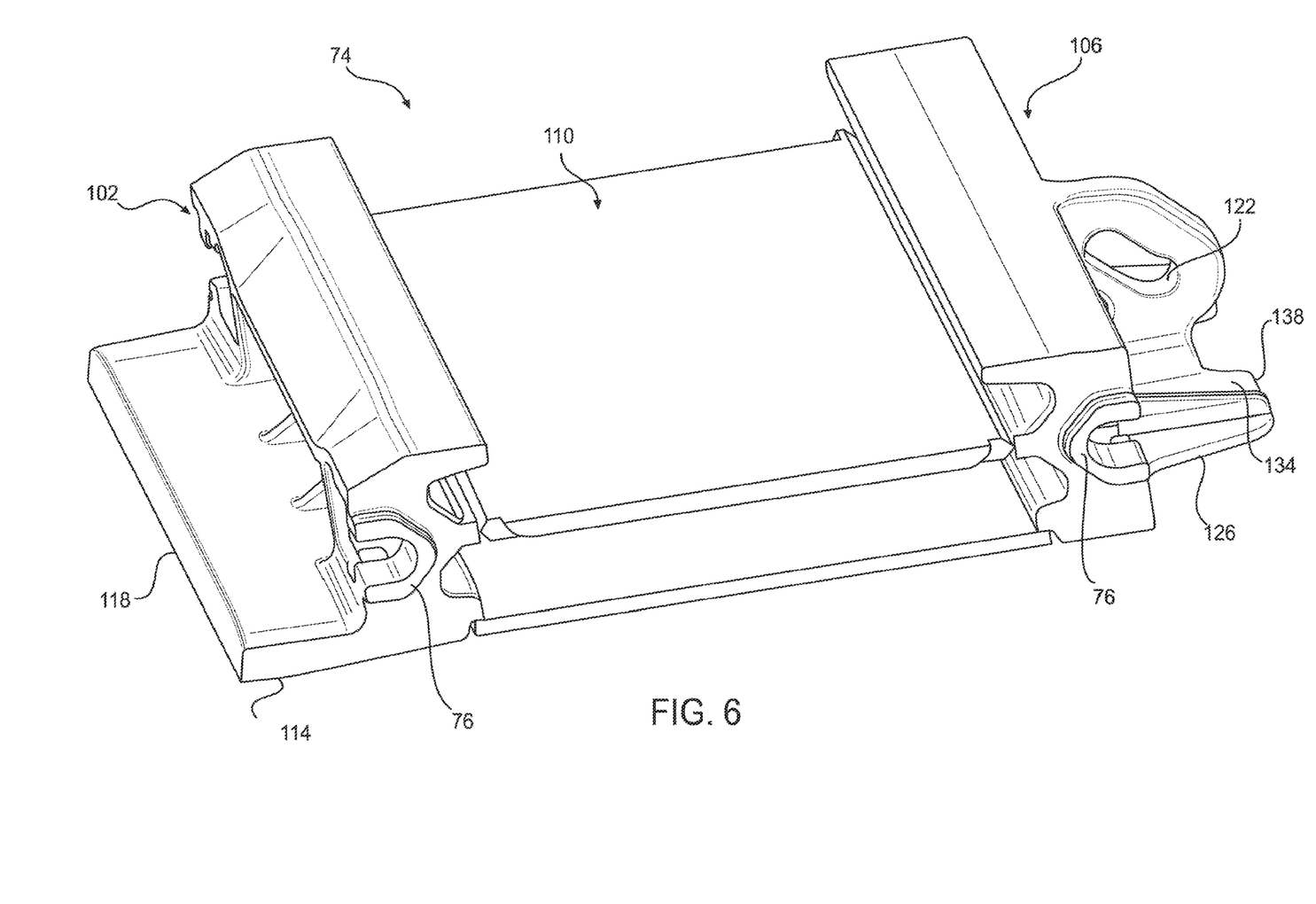
FIG. 6 is a perspective view of the conveyor pan section of FIG. 5.
Figure 7:
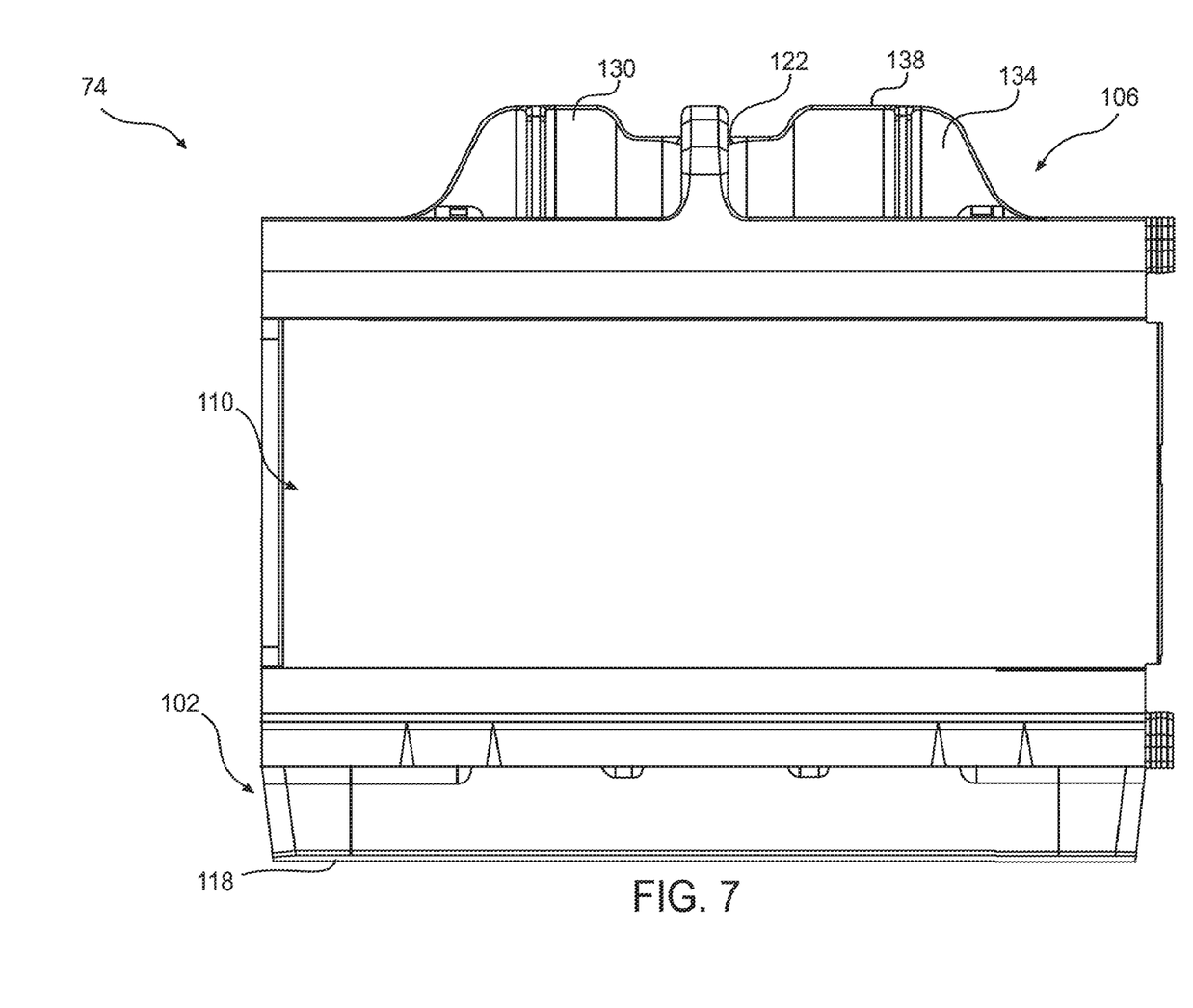
FIG. 7 is a top view of the conveyor pan of FIG. 5.

Referring to FIG. 6, in the illustrated embodiment the individual pan sections 74 include connecting portions 76 on one end of the pan section 74, the each connecting portion 76 engages a complementary structure on an end of an adjacent pan section 74. The pan sections 74 are connected sequentially to one another and extend along the mine face 62. In other embodiments, the pan sections 74 may be coupled together in a different manner. Each pan sections 74 define a center line 154 (FIG. 8) extending from a first end to a second end of the section 74, and the center line 154 is positioned between the toe 102 and the heel 106.

Figure 5:
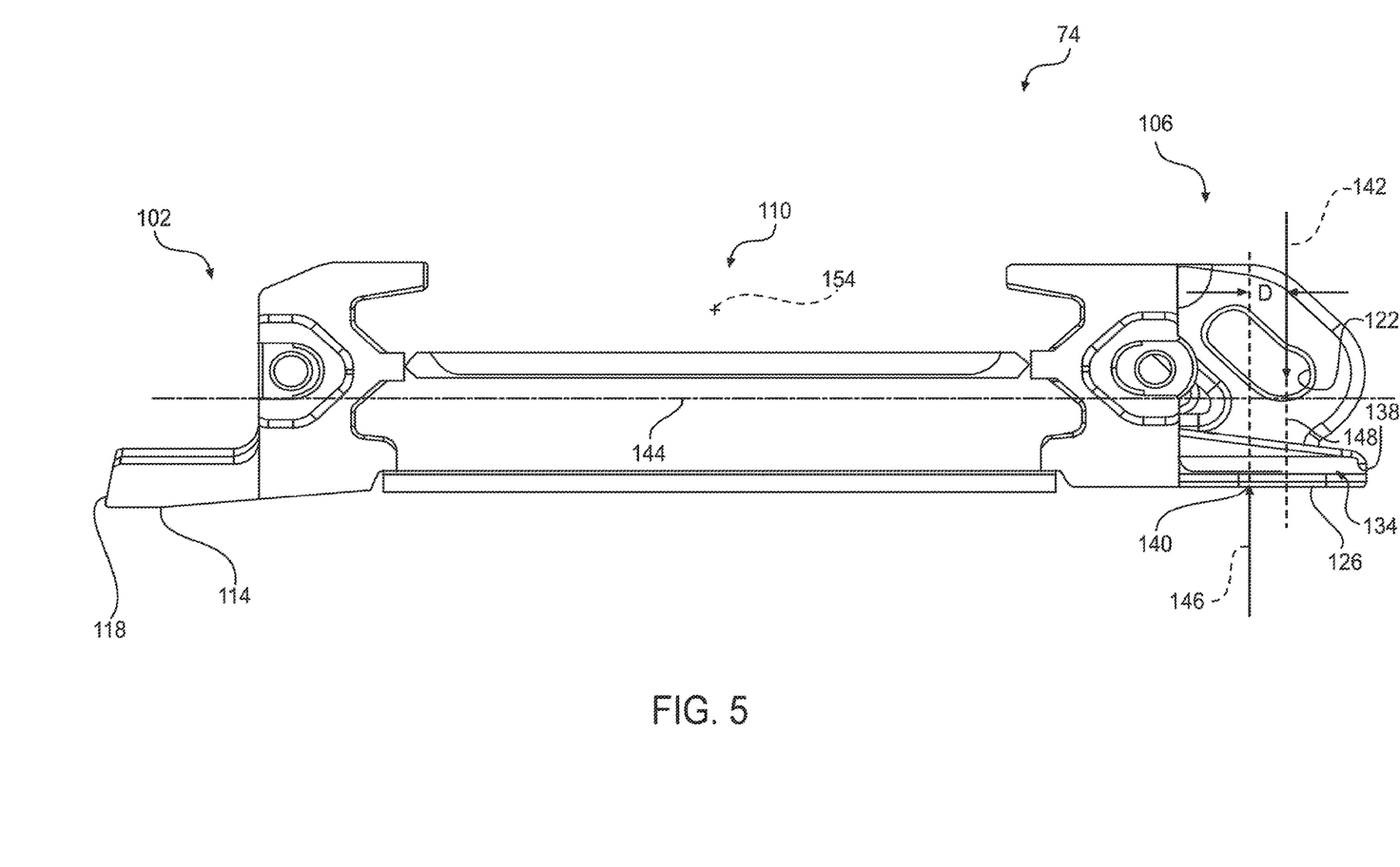
FIG. 5 is a side view of a conveyor pan section.

Referring now to FIG. 5, the lug 122 defines a connection point with a pin (not shown) of the roof support base 86. The roof support base 86 exerts a downward force 142 through the pin on the heel 106. The force 142 generally defines a line of action 148 aligned with the lug 122 or other connection point between the ram 94 and the pan section 74. The force 142 is generally distributed over the heel contact surface 126, applying a heel pressure on the floor 90. As a result, the floor 90 exerts a reaction pressure on the heel contact surface 126, and this reaction pressure may be approximated as a reaction force 146 acting at the heel centroid 140. The weight of other components (e.g., the mining machine 10, the conveyor 66, the material on the conveyor 66, etc.) may also be distributed over the toe contact surface 114 and the heel contact surface 126.

In some embodiments, the reaction force 146 is offset from the line of action 148 of the force 142 by an axial offset distance D. As used herein, "axial offset distance" refers to a distance measured in a direction parallel to the pan axis 144. In the illustrated embodiment, the line of action 148 is positioned on the goaf-side of the heel centroid 140 (e.g., to the right of the heel centroid 140 in FIG. 5). In some embodiments, the heel contact surface 126 and the protrusions 130, 134 may sized such that the line of action 148 is positioned on the face-side of the heel centroid 140 (e.g., to the left of the heel centroid 140 in FIG. 5). The axial offset distance D is considered positive when the line of action 148 is positioned on the goaf-side of the heel centroid 140 (i.e., the heel centroid 140 is between the centerline 154 and the line of action 148). The axial offset distance D is considered negative when the line of action 148 is positioned on the face-side of the heel centroid 140 (i.e., the line of action 148 is between the heel centroid 140 and the centerline 154). In some embodiments, the axial offset distance D is less than approximately positive 18.5 cm. In some embodiments, the axial offset distance D is approximately positive 17.8 cm. Using the convention defined above, an axial offset distance that is less than positive 18.5 cm would include any negative values for the axial offset distance D.

In a conventional pan section 74, the downward force from the base 86 of the roof support 78 is positioned near the rearward edge of the heel 106, well behind the line of action of the reaction force 146 from the floor 90. The distance between the force 142 and the reaction force 146 induces a large moment on the pan section 74 causing the toe 102 to elevate or climb (i.e., pivot clockwise in FIG. 5) relative to the floor 90. The rising of the toe 102 or leading edge 118 may result in loss of control of the seam section that is intended to be cut. The provision of protrusions 130, 134 enlarges the heel contact surface 126 and moves the heel centroid 140 (and therefore the line of action of the reaction force 146) toward the rear edge 138, away from the centerline 154 (FIG. 5) of the pan 110. In addition, the attachment point or lug 122 is positioned closer to the centerline 154 of the pan 110, thereby moving the line of action 148 of the force 142 away from the rear edge 138. Since the offset distance D between the force 142 and the reaction force 146 is decreased, the moment acting on the pan section 74 also decreases. As a result, the elevation or climb of the toe is minimized.

In the illustrated embodiment, the lug 122 and the line of action 148 of the force 142 are positioned between the rear edge 138 and the centerline 154. In some embodiments, the line of action 148 is spaced apart from the rear edge 138 by at least approximately 7 cm. In some embodiments, the line of action 148 is spaced apart from the rear edge 138 by at least approximately 8 cm. In some embodiments, the line of action 148 is spaced apart from the rear edge 138 by at least approximately 9 cm. In some embodiments, the line of action 148 is spaced apart from the rear edge 138 by at least approximately 10 cm. In some embodiments, the line of action 148 is spaced apart from the rear edge 138 by at least approximately 11 cm. In some embodiments, the line of action 148 is spaced apart from the rear edge 138 by at least approximately 12 cm. In some embodiments, the line of action 148 is spaced apart from the rear edge 138 by approximately 12.3 cm.

Figure 9:
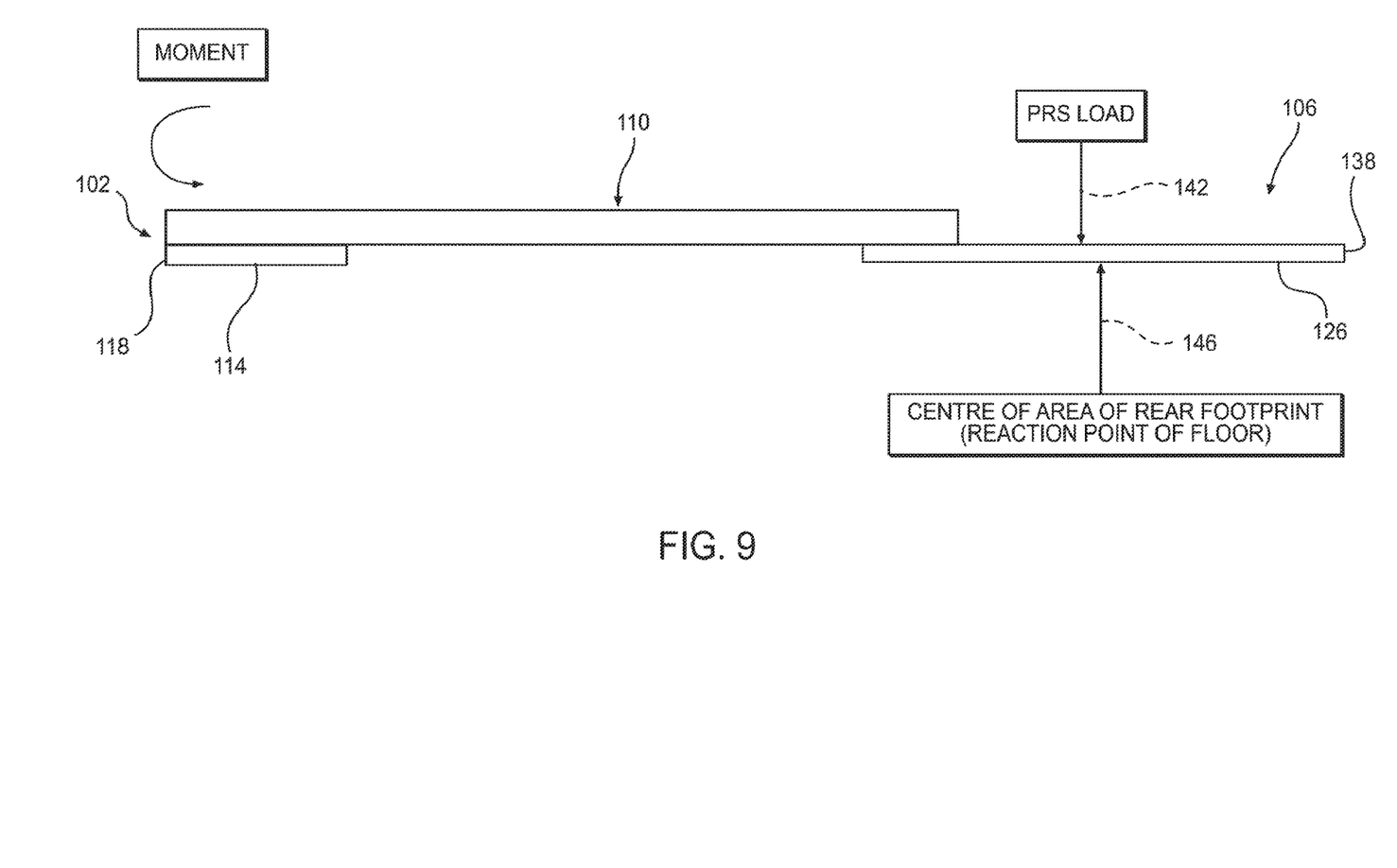
FIG. 9 illustrates a schematic side view of a conveyor pan section according to another embodiment.

In some embodiments, the heel contact surface 126 is sufficiently large so that the reaction force 146 is aligned with the force 142, resulting in no moment on the pan section 74. In other embodiments (FIG. 9), the heel contact surface 126 is sufficiently large so that the heel centroid 140 is closer to the rear edge 138 than the force 142, resulting in a moment that causes the toe 102 to pivot toward the floor 90.

Also, since the provision of the protrusions 130, 134 enlarges the heel contact surface 126 compared to prior art pans, the force 142 is distributed over a larger area. As a result, the pressure exerted by the heel 106 on the floor 90 relative to the ground pressure exerted on the leading edge 118 is reduced. In some embodiments, a ratio of the pressure exerted by the heel contact surface 126 (i.e., heel ground pressure) to a pressure exerted by the toe contact surface 114 (i.e., toe ground pressure) is less than approximately 30:1. In some embodiments the ratio of the heel ground pressure to the toe ground pressure is less than approximately 20:1. In some embodiments the ratio of the heel ground pressure to the toe ground pressure is less than approximately 10:1. In some embodiments the ratio of the heel ground pressure to the toe ground pressure is less than approximately 5:1. In some embodiments the ratio of the heel ground pressure to the toe ground pressure is approximately 4.8:1.

Although certain aspects have been described in detail with reference to certain preferred embodiments, variations and modifications exist within the scope and spirit of one or more independent aspects as described. Various features and advantages are set forth in the following claims.

What is claimed is:

1. A conveyor pan for supporting a portion of a mining conveyor extending along a mine face, the mining conveyor positioned between the mine face and a goaf, the conveyor pan comprising:
   a deck including a first side configured to be positioned proximate the mine face and a second side configured to be positioned proximate the goaf;
   a toe positioned adjacent the first side of the deck, the toe including a toe contact surface defining a toe surface area;
   a heel positioned adjacent the second side of the deck, the heel including a lug and a heel contact surface, the lug configured to be coupled to an advancement mechanism, the heel contact surface defining a heel surface area greater than the toe surface area.

2. The conveyor pan of claim 1, wherein the toe contact surface transmits a toe ground pressure to a ground surface, wherein the heel contact surface transmits a heel ground pressure to the ground surface, wherein a ratio of the heel ground pressure to the toe ground pressure is less than approximately 30:1.

3. The conveyor pan of claim 2, wherein the ratio of the heel ground pressure to the toe ground pressure is less than approximately 10:1.

4. The conveyor pan of claim 3, wherein the ratio of the heel ground pressure to the toe ground pressure is less than approximately 5:1.

5. The conveyor pan of claim 1, wherein the heel contact surface defines a heel centroid, wherein the heel centroid divides the heel surface area into a first portion positioned proximate the deck and a second portion configured to the positioned proximate the goaf, the first portion defining a first surface area, the second portion defining a second surface area, wherein a ratio of the second surface to the heel surface area is greater than approximately 50%.

6. The conveyor pan of claim 5, wherein the ratio of the second surface to the heel surface area is greater than approximately 60%.

7. The conveyor pan of claim 1, wherein the heel contact surface defines a heel centroid, wherein the heel centroid divides the heel surface area into a first portion positioned proximate the deck and a second portion configured to the positioned proximate the goaf, the first portion defining a first surface area, the second portion defining a second surface area, wherein the second surface area is at least approximately 0.2 m$^2$.

8. The conveyor pan of claim 7, wherein the second surface area is at least approximately 0.4 m$^2$.

9. The conveyor pan of claim 8, wherein the second surface area is at least approximately 0.6 m$^2$.

10. The conveyor pan of claim 1, wherein the heel surface area is at least approximately 0.50 m$^2$.

11. The conveyor pan of claim 10, wherein the heel surface area is at least approximately 0.75 m$^2$.

12. The conveyor pan of claim 11, wherein the heel surface area is at least approximately 0.95 m$^2$.

13. The conveyor pan of claim 1, wherein the deck defines an axis extending between the first side and the second side, wherein the heel contact surface defines a heel centroid, wherein the lug is configured to receive a pin exerting a force on the heel along a line of action, the line of action being axially offset from the heel centroid by an offset distance, the offset distance being positive when the heel centroid is positioned between the toe and the line of action, wherein the offset distance is negative when the line of action is positioned between the toe and the heel centroid, wherein the offset distance is less than positive 18.5 cm.

14. The conveyor pan of claim 1, wherein a ratio of the heel surface area to the toe surface area is at least approximately 1.5:1.

15. The conveyor pan of claim 14, wherein the ratio of the heel surface area to the toe surface area is at least approximately 2:1.

16. The conveyor pan of claim 15, wherein the ratio of the heel surface area to the toe surface area is at least approximately 2.3:1.

17. A conveyor pan for supporting a portion of a mining conveyor extending along a mine face, the mining conveyor positioned between the mine face and a goaf, the conveyor pan comprising:
   a deck including a first side configured to be positioned proximate the mine face, a second side configured to be positioned proximate the goaf, a first end, and a second end, the deck defining a centerline axis extending from the first end to the second end, the centerline axis positioned between the first side and the second side;
   a toe positioned adjacent the first side of the deck, the toe including a toe contact surface;
   a heel positioned adjacent the second side of the deck, the heel including a lug and a heel contact surface, the lug configured to be coupled to an advancement mechanism, the heel contact surface including a plurality of protrusions extending away from the centerline axis, the protrusions defining a rear edge, the lug positioned between the centerline and the rear edge.

18. The conveyor pan of claim 17, wherein the deck defines a transverse axis extending between the first side and the second side, wherein the heel contact surface defines a heel centroid, wherein the lug defines a connection point at which a force is exerted on the heel along a line of action, the line of action being axially offset from the heel centroid along the transverse axis by an offset distance less than approximately 18.5 cm.

19. The conveyor pan of claim 18, wherein the offset distance is positive when the heel centroid is positioned between the centerline axis and the line of action, wherein the offset distance is negative when the line of action is positioned between the centerline axis and the heel centroid, wherein the offset distance is less than positive 18.5 cm.

20. The conveyor pan of claim 17, wherein the heel contact surface defines a heel centroid, wherein the lug defines a connection point at which a force is exerted on the heel along a line of action, the line of action being positioned between the heel centroid and the centerline axis.

21. The conveyor pan of claim 17, wherein the heel contact surface defines a heel surface area, wherein the toe contact surface defines a toe surface area, wherein a ratio of the heel surface area to the toe surface area is at least approximately 1.5:1.

22. The conveyor pan of claim 21, wherein the ratio of the heel surface area to the toe surface area is at least approximately 2:1.

23. The conveyor pan of claim 22, wherein the ratio of the heel surface area to the toe surface area is at least approximately 2.3:1.

* * * * *